No. 745,025. PATENTED NOV. 24, 1903.
A. G. PORTER.
HYDROCARBON BURNER.
APPLICATION FILED JAN. 8, 1903.

NO MODEL.

Witnesses: Augustus G. Porter, Inventor.
Julius Lankes By Neuhart & Burkhart
Bert Mason Attorneys.

No. 745,025.

Patented November 24, 1903.

UNITED STATES PATENT OFFICE.

AUGUSTUS G. PORTER, OF NIAGARA FALLS, NEW YORK.

HYDROCARBON-BURNER.

SPECIFICATION forming part of Letters Patent No. 745,025, dated November 24, 1903.

Application filed January 8, 1903. Serial No. 138,288. (No model.)

*To all whom it may concern:*

Be it known that I, AUGUSTUS G. PORTER, a citizen of the United States, residing at Niagara Falls, in the county of Erie and State of New York, have invented certain new and useful Improvements in Hydrocarbon-Burners, of which the following is a specification.

My invention relates to improvements in hydrocarbon-burners, such as are provided with non-combustible absorbent material charged with hydrocarbon, and which is designed for use in the fireplace of a cooking or heating stove.

The object of my invention is the production of a portable hydrocarbon-burner which can be quickly and conveniently placed in the fireplace of a stove or removed therefrom and which can be conveniently charged with hydrocarbon to an extent commensurate with the length of time it is intended the burner shall remain ignited.

Another object is to provide a superposed casing or jacket containing refractory material and which is separated from the lower fuel-charged casing or jacket by an air-space to cause a thorough mingling of air with the flame.

Other objects will be apparent from the detailed description, which will presently follow.

The invention consists of the new and novel construction, arrangement, and combination of parts, as will be hereinafter more fully described, and particularly pointed out in the appended claims.

Figure 1:
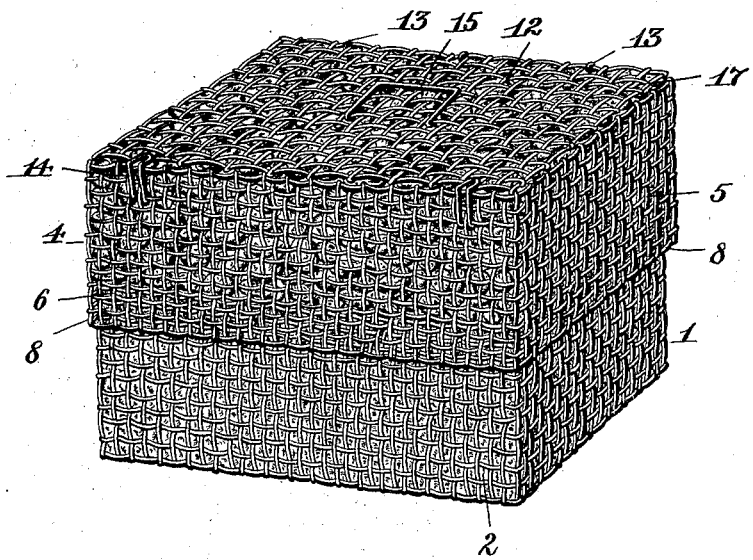
Figure 2:
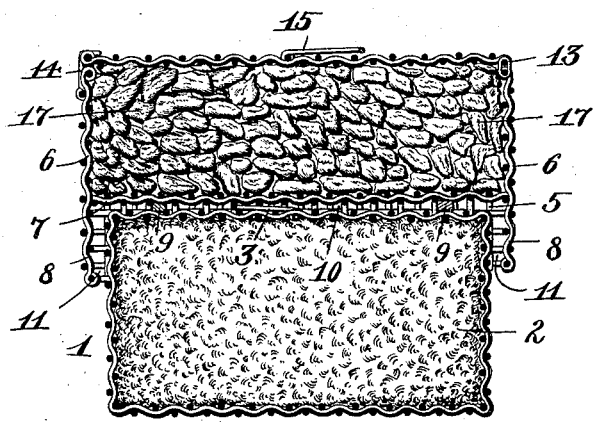

In the drawings, Figure 1 is a perspective view of the complete burner. Fig. 2 is a vertical transverse section through the same.

Referring to the drawings in detail, like numerals of reference refer to like parts in both figures.

The burner comprises a casing or jacket 1, closed on all sides and formed, preferably, of wire screening, which will withstand intense heat and fire. The said casing or jacket is filled with a non-combustible absorbent material 2, such as asbestos or mineral wool, which is adapted to be saturated with petroleum or other liquid hydrocarbon preparatory to igniting the burner. A handle 3 is secured to the upper inclosing wall of this casing to permit of conveniently lifting the same into the fireplace of a stove or removing the same therefrom.

A superposed casing or jacket 4 is provided, which is also constructed of wire screening and comprises end walls 5, side walls 6, and a bottom 7, positioned between the upper and lower ends of the end and side walls, thus providing retaining-wall portions 8, which overlap the sides and ends of the lower casing or jacket and prevent the relative displacement of the two casings. Suitable spacers or separators 9 are secured to the bottom of the superposed casing or jacket and form an air-space 10 between the said bottom and the upper inclosing wall of the lower casing or jacket. Between the retaining-wall portions 8 and the side and end inclosing walls of the lower casing air-passages 11 are formed, which communicate with the air-space 10 and lead the air-currents thereto.

To the upper end of one side wall of the superposed casing or jacket a cover 12 is secured by means of loops 13, which serve as hinges and permit the cover to be opened or closed at will. To the upper end of the other side wall retaining-clips 14 are secured, which have their engaging ends passing over the front edge of the cover, and thereby securely lock the same. A suitable handle is secured to the center of the cover, whereby the upper superposed casing can be conveniently carried from place to place when the cover is closed and locked.

In the superposed casing or jacket refractory material 16, such as fire-brick or the like, is placed, as is common in gas-stoves, the material being preferably of small pieces of irregular shape, which cause crevices to be formed through which the flames and air may pass to heat the upper layers of the material as well as the lower layers. The said refractory material can be removed from the said casing or jacket with convenience and ease by opening the cover, and can therefore be thoroughly cleaned for the purpose of removing the non-combustible deposits therefrom. By applying a lighted match to the hydrocarbon-charged material in the lower casing or jacket the flames are naturally directed upward and pass into the superposed jacket and through the crevices between the small pieces of refractory material confined therein, thus causing the same to become fiery. The air passes through the air-passages 11 and through the openings or meshes in the retaining-wall portions 8 and enters the air-space 10, where it comes in contact with the flames and enlivens the same.

Having thus described my invention, what I claim is—

1. In a hydrocarbon-burner, the combination of a perforated casing or jacket containing a non-combustible absorbent material, and a superposed casing or jacket containing a quantity of refractory material and having a perforated bottom separated from the first-mentioned casing or jacket by an air-space.

2. In a hydrocarbon-burner, the combination of a perforated casing or jacket containing a non-combustible absorbent material, and a superposed perforated casing or jacket containing a quantity of refractory material and being separated from the first-mentioned casing or jacket by an air-space through which air is supplied to the flame.

3. In a hydrocarbon-burner, the combination of a screen-jacket containing a non-combustible absorbent material, a superposed screen-jacket containing a quantity of refractory material and having its side and end walls overlapping the side and end walls of the first-mentioned screen-jacket, and an air-space between the two screen-jackets through which air is supplied to the flame.

4. In a hydrocarbon-burner, the combination of a wire-screen jacket containing a non-combustible material and a superposed wire-screen jacket containing refractory material and having its side and end walls overlapping the upper portions of the side and end walls of the first-mentioned wire-screen jacket, air-passages between said overlapping walls and the first-mentioned wire-screen jacket, and an air-space between the bottom of the superposed jacket and the top of the other jacket.

5. In a hydrocarbon-burner, the combination of a wire-screen jacket closed on all sides and containing a non-combustible absorbent material, a superposed wire-screen jacket supported on the first-mentioned jacket and having a quantity of refractory material therein, and a cover hinged to the upper edge of said superposed jacket.

6. In a hydrocarbon-burner, the combination of a wire-screen jacket containing a non-combustible absorbent material, a second wire-screen jacket separated from the first-mentioned jacket by an air-space and having a quantity of refractory material therein, a cover hinged to the upper edge of one wall of said superposed jacket, and keepers secured to the opposite wall and being adapted to engage the free edge of said cover to lock the same.

In testimony whereof I have hereunto set my hand in the presence of two subscribing witnesses.

AUGUSTUS G. PORTER.

Witnesses:
CHAS. F. BURKHARD,
EMIL NEUHART.